Figure 4:
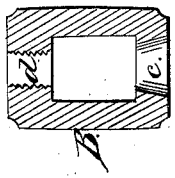

G. W. N. Yost,
Harness Ring,
№ 30,019.  Patented Sep. 11, 1860.

Witnesses:
John Carson
Daniel Shirl

Inventor:
G. W. N. Yost

UNITED STATES PATENT OFFICE.

G. W. N. YOST, OF YELLOW SPRINGS, OHIO.

LINK FOR CHAINS.

Specification of Letters Patent No. 30,019, dated September 11, 1860.

*To all whom it may concern:*

Be it known that I, G. W. N. YOST, of Yellow Springs, in the county of Greene, in the State of Ohio, have invented a new and Improved Open Link for Mending Chains and other Purposes; and I do hereby declare that the following is a full and exact description thereof, reference being had to the accompanying drawings, and to the letters of reference marked thereon.

In the drawing, similar characters refer to like parts.

Figure 3:
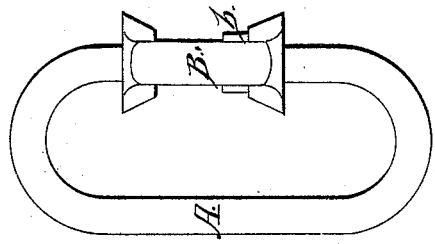
Figure 2:
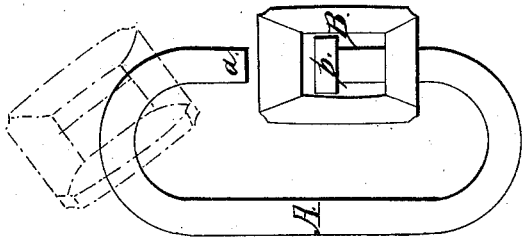
Figure 1:
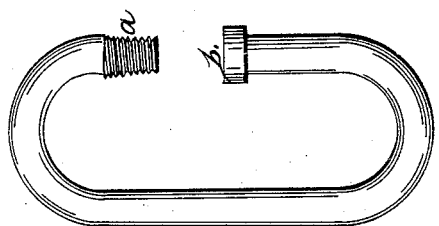

Figure 1, shows the link as constructed without the swivel. Fig. 2, is the link with the swivel: the red lines indicating the manner of putting the swivel on the link. Fig. 3, is the link as it appears after the chain is mended. Fig. 4, is a section through the swivel.

To enable those skilled in the art to make and use my invention, I will describe its construction and operation.

A, is a chain-link, with a portion of one side cut out, and having on one end a thread $a$ cut, and on the other a head or shoulder $b$ upset.

B is a swivel forming the connection between the ends of the links.

$c$ is a conical hole in the swivel, (which opening is larger at the outer portion of the swivel.)

$d$, is a female screw in the swivel, and in line with the opening $c$; this screw is intended to act as the nut for the screw $a$ on the end of link A.

In operating my invention the link A is passed through the links of the chain to be mended, or shortened. The screw end of the link is then passed through beveled hole $c$ of swivel (see red lines), while the swivel is slid down the link as seen in Fig. 2. The swivel then, by its female screw $d$ takes hold on the male screw $a$ on the link, and is thereby screwed up tightly as in Fig. 3, forming a strong connected link, or the link can first receive the swivel as seen at B, Fig. 2, before the broken chain's links are connected by the link A. One additional advantage of my "open link", is to take the place of the ordinary open-link used by farmers, and others for attaching the swingletree to the double tree, or to the plow, &c.

It will be seen that this invention is very easily adjustable, and cannot, of itself, become detached. It is a cheap, quickly applied fastening, for any chains, or other similar articles.

Having thus described my invention, what I claim as new and desire to secure by Letters Patent, is—

The combination and arrangement of the open link A, and swivel B, constructed, and operating substantially as described, and for the purposes set forth.

G. W. N. YOST.

Witnesses:
JOHN CARSON,
DANIEL IKIRT.